(12) United States Patent
Varda et al.

(10) Patent No.: US 11,621,995 B2
(45) Date of Patent: Apr. 4, 2023

(54) PRELOADING ON-DEMAND CODE PIECES IN A DISTRIBUTED CLOUD COMPUTING NETWORK

(71) Applicant: CLOUDFLARE, INC., San Francisco, CA (US)

(72) Inventors: Kenton Taylor Varda, Austin, TX (US); Lucas Pardue, London (GB); Patrick Allen Meenan, South Riding, VA (US)

(73) Assignee: CLOUDFLARE, INC., San Francisco, CA (US)

( * ) Notice: Subject to any disclaimer, the term of this patent is extended or adjusted under 35 U.S.C. 154(b) by 132 days.

(21) Appl. No.: 16/940,219

(22) Filed: Jul. 27, 2020

(65) Prior Publication Data

US 2022/0030049 A1 Jan. 27, 2022

(51) Int. Cl.
*H04L 67/02* (2022.01)
*H04L 67/10* (2022.01)
*G06F 9/445* (2018.01)

(52) U.S. Cl.
CPC .............. *H04L 67/02* (2013.01); *G06F 9/445* (2013.01); *H04L 67/10* (2013.01)

(58) Field of Classification Search
CPC .......... H04L 67/02; H04L 67/10; G06F 9/445
USPC .................................................. 709/217, 219
See application file for complete search history.

(56) References Cited

U.S. PATENT DOCUMENTS

| 10,331,462 B1 * | 6/2019 | Varda .................. H04L 29/06 |
| 2019/0182349 A1 * | 6/2019 | Goel .................... H04L 67/145 |
| 2020/0008174 A1 | 3/2020 | Cybulski et al. |

OTHER PUBLICATIONS

Beswick, J., "New for AWS Lambda—Predictable start-up times with Provisioned Concurrency," AWS Compute Blog, Dec. 4, 2019, downloaded from https://aws.amazon.com/blogs/compute/new-for-aws-lambda-predictable-start-up-times-with-provisioned-concurrency/ on Jul. 27, 2020, pp. 1-12.

Foltzer, A., "The lifecycle and performance of a Lucet instance," Fastly, Inc. Blog, May 15, 2019, downloaded from https://www.fastly.com/blog/lucet-performance-and-lifecycle on Jul. 27, 2020, pp. 1-15.

(Continued)

*Primary Examiner* — David R Lazaro
*Assistant Examiner* — Mariegeorges A Henry
(74) *Attorney, Agent, or Firm* — Nicholson De Vos Webster & Elliott LLP (57) ABSTRACT

A compute server of a distributed cloud computing network receives an indication of a hostname in a Transport Layer Security (TLS) handshake message from a client device. The compute server determines that an on-demand code piece is configured to execute on the compute server responsive to receiving an HTTP request for the hostname. Prior to receiving the request for the hostname, the compute server preloads the on-demand code piece for execution. The compute server receives an HTTP request from the client device that triggers execution of the preloaded on-demand code piece. The compute server executed the preloaded on-demand code piece and generates a response to the HTTP request based in part on the executed code piece. The compute server transmits the response to the client device.

24 Claims, 6 Drawing Sheets

(56) References Cited

OTHER PUBLICATIONS

Leach, S., "Performance matters: why Compute@Edge does not yet support JavaScript," Fastly, Inc. Blog, Jun. 29, 2020, downloaded from https://www.fastly.com/blog/why-edge-compute-does-not-yet-support-javascript on Jul. 27, 2020, pp. 1-5.

Shilkov, M., "Cold Starts in AWS Lambda," last updated Apr. 26, 2020, downloaded from https://mikhail.io/serverless/coldstarts/aws/ on Jul. 27, 2020, pp. 1-3.

\* cited by examiner

ISOLATED EXECUTION
ENVRIONMENT MODEL

FIG. 5

VIRTUAL MACHINE
MODEL

PRELOADING ON-DEMAND CODE PIECES IN A DISTRIBUTED CLOUD COMPUTING NETWORK

FIELD

Embodiments of the invention relate to the field of network computing; and more specifically, to preloading on-demand code pieces in a distributed cloud computing network.

BACKGROUND

Historically, web application code has been split between origin servers and browsers that are connected by a network that transmits data from point to point. Many large websites were first run on large physical mainframe servers that could handle large traffic and large data. Over time a switch was made to run websites on tens to hundreds of commodity servers that allowed for a reduction in cost, more fault tolerance, and increased performance. The next switch was using virtual machines where one physical machine could be split into multiple virtual machines that can be independently managed. However, virtual machines typically have a high cost. For instance, each virtual machine is typically allocated hundreds of megabytes of RAM and typically takes tens of seconds to boot. Containers can be used to further provide isolation and are less resource intensive than virtual machines. But web application code running in a container typically is run in its own OS-level process, consuming RAM and inducing context-switching overhead. Also, while native code can load quickly in a container, many server-oriented language environments are not optimized for startup time.

Some cloud computing platforms spin up a containerized process for the code and auto-scales the process which creates cold-starts. A cold-start occurs when a new copy of the code starts on a machine. A new containerized process is begun which can take between hundreds of milliseconds to multiple seconds (e.g., between 500 ms to 10 seconds). This means that any request may be hanging for as much time as it takes to begin the new containerized process (e.g., as much as ten seconds). Also, this containerized process can only process a single request at a time and a new containerized process must be cold-started each time an additional concurrent request is received. This means that a laggy request can happen over and over. Also, if the containerized process does not receive a request to process within a certain amount of time, it will automatically shut down and will need to be cold-started again once the request is received. When new code is deployed, this entire process proceeds again as each containerized process needs to be spun up anew.

One of the key features of an operating system is the ability to run many processes at once. The operating system transparently switches between the various processes that want to run code at any given time. The operating system accomplishes this through a context switch that moves the memory required for one process out and the memory required for the next process in. A context switch can take as much as 100 microseconds. When multiplied by all the processes running on the average cloud computing platform server, it creates a heavy overhead. This means that not all the CPU's power can be devoted to actually executing the customer code, but rather some is spent switching between the processes.

Most computing platforms are meant to be run by individual customers on their own servers. They are not intended to be run in a multi-tenant environment, executing code of other customers. Memory is often the highest cost of running a customer's code (even higher than the CPU cost).

Building and maintaining applications that easily scale to support spikes in demand or a global user base has generally required a large amount of both upfront engineering work and ongoing operational support. Developers are forced to spend significant time on writing supporting code rather than building the application itself. Many cloud computing platforms require the developer to specify where the code should run (e.g., at which nodes of the cloud computing platform), often with a small number of nodes that can be selected.

All applications typically cannot be permanently loaded in memory due to memory constraints of the system. For instance, each loaded application takes at least some memory to store compiled code and program state. Keeping an application loaded while not in use is typically not effective memory management.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

A method and apparatus for preloading on-demand code in a distributed cloud computing network is described. The distributed cloud computing network includes multiple compute servers that are geographically distributed such as in different locations throughout the world. There may be hundreds of compute servers that are geographically distributed in different points-of-presences (PoPs). Each PoP may include one or more physical servers (e.g., one or more compute servers, one or more control servers, one or more DNS servers (e.g., one or more authoritative name servers, one or more proxy DNS servers), and one or more other pieces of network equipment such as router(s), switch(es), and/or hub(s)). Each PoP may be part of a different data center and/or colocation site. The distributed cloud computing network may provide different services for customers (e.g., domain owners or operators) such as protecting against internet-based threats, performance services (e.g., acting as a content delivery network (CDN) and dynamically caching customer's files closer to visitors, page acceleration/optimization), TCP stack optimizations, and/or other services.

On-demand code pieces can be deployed to all or some of the compute servers of the distributed cloud computing network. An on-demand code piece may be "serverless" code that is configured to execute on a compute server based on a triggering condition such as receiving a request with a particular path. An on-demand code piece may be a third-party on-demand code piece that is written and/or deployed by third-parties such as customers of the cloud computing network. An on-demand code piece may be a first-party on-demand code piece that is written by or deployed by an operator of the cloud computing network. An on-demand code piece can be for example, a piece of JavaScript or other interpreted language, a WebAssembly (WASM) compiled piece of code, or other compiled code. In an embodiment, an on-demand code piece is written against standard Web Platform APIs such as the W3C standard ServiceWorker API for receiving HTTP requests. By way of example, an on-demand code piece can, for example, intercept and answer HTTP requests and make outgoing HTTP subrequests as part of answering an HTTP request. For purposes of this description, each on-demand code piece is referred to as a worker script and an executed instance of the worker script is referred to as a worker.

A worker script may be run in an execution environment in which a single process can safely run on-demand code pieces. The single process can contain multiple execution environments at the same time and the process can seamlessly switch between them. Code in one execution environment cannot interfere with code running in a different execution environment despite being in the same process. The execution environments are managed in user-space rather than by an operating system. Each execution environment uses its own mechanism to ensure safe memory access, such as preventing the code from requesting access to arbitrary memory (restricting its use to the objects it has been given) and/or interpreting pointers within a private address space that is a subset of an overall address space. This execution environment is not a container or virtual machine. For purposes of description, this type of execution environment is sometimes referred herein as an isolated execution environment. In a specific implementation, the worker script is run in an isolate of the V8 JavaScript engine.

Because a single process can run multiple isolated execution environments, the overhead of running the isolated execution environments is occurred once (e.g., starting the single process to run the isolated execution environments) and isolated execution environments can be started and run with very little individual overhead. Further, as will be described in greater detail later herein, isolated execution environments and corresponding code may be preloaded thereby reducing or eliminating any cold-start delay. The worker scripts are not executed using a virtual machine or a container in an embodiment. Unlike other cloud computing platforms that spin up a containerized process for processing code that can take as much as ten seconds, an isolated execution environment can be started in as little as 5 ms because a new process does not need to be started (assuming the single process that runs the isolated execution environments is started). Also, since the worker scripts can be run in a single process, there are no expensive context switches like experienced with other cloud computing platforms which means that more time is spent running the code instead of performing context switches. Also, because the implementations of the single process are shared between all isolated execution environments, the memory requirements are less than traditional cloud computing platforms.

On-demand code pieces are triggered to execute based on the destination of the incoming requests (e.g., the path name of an incoming request included in a request URL). For instance, an on-demand code piece may be executed when a request URL matches a URL matching pattern configured for a zone. By way of example for the zone "example.com", an on-demand code piece may be configured to execute upon a request URL matching "example.com/index.html."

An on-demand code piece must be loaded for execution before it can be executed on a machine. A cold-start occurs when an on-demand code piece is not loaded and thus cannot execute immediately. In the case of a containerized process, loading the code piece may include spinning up a new container that can take between hundreds of milliseconds to as much as ten seconds. In the case of an isolated execution environment as described herein, loading the code piece may include creating an isolated execution environment, fetching the code piece (e.g., either from a local disk or from a remote storage location), parsing and/or compiling the code piece using an interpreter or a compiler (e.g., a Just-In-Time (JIT) compiler) if the code language is not compiled, and running the code piece's startup code (e.g., if JavaScript is used, executing the global scope).

Conventionally, an on-demand code piece is not loaded unless a request (e.g., an HTTP request) is received that triggers the execution of that on-demand code piece. In such a case, there is a cold-start delay for loading the code piece if it is not already loaded for execution. However, in an embodiment, if the compute server determines that a particular on-demand code piece is likely to be imminently executed and the code piece is not loaded, the compute server preloads that code piece to reduce or eliminate the cold-start delay. Thus, when the request is received that triggers the execution of the on-demand code piece, the code piece will already be loaded for execution.

The compute server can determine that a particular on-demand code piece is likely to be imminently executed in different ways. For instance, a Transport Layer Security (TLS) handshake that identifies the hostname may be used such as through the Server Name Indication (SNI) extension or the Encrypted Server Name Indication (ESNI) extension. A TLS connection is established before the compute server receives a corresponding HTTP request, which typically occurs immediately after the TLS handshake is complete. The SNI extension and the ESNI extension each identify a hostname. In the case of ESNI, the hostname is encrypted which must be decrypted by the compute server. Since the establishment of a TLS connection usually immediately precedes a request such as an HTTP request, the identified hostname is an indication that an HTTP request for that hostname will immediately follow the TLS handshake. In an embodiment, responsive to receiving an indication of a hostname from a client through a TLS handshake such as the SNI or ESNI extension and determining that the hostname is mapped to an on-demand code piece, the compute server preloads that on-demand code piece if it was not already loaded. Thus, instead of waiting to receive the HTTP request that triggers the execution of an on-demand code piece before loading that code piece (which introduces a cold-start delay), that code piece is preloaded upon receiving an indication of a hostname from a client through the TLS handshake thereby eliminating or reducing the amount of cold-start delay.

As another example, if there is a unique mapping from an IP address(es) to a single hostname, the destination IP address may be used in the case that there is a single hostname that corresponds to a single destination IP address. In such a case, the first SYN packet or connection establishment at that destination IP address may be used as a trigger for preloading the on-demand code piece.

As another example, a DNS lookup may be used as a trigger to preload an on-demand code piece. For instance, a DNS query for a hostname (e.g., an A or AAAA record query) may be received at the PoP and the queried hostname can trigger the preloading of the on-demand code piece. If there are multiple compute servers within the PoP that may receive the actual request that triggers the execution of the on-demand code piece, in an embodiment each of the compute servers preload the on-demand code piece.

Preloading an on-demand code piece is like loading an on-demand code piece. In the case of an isolated execution environment as described herein, preloading the code piece may include creating an isolated execution environment, fetching the code piece (e.g., either from a local disk or from a remote storage location), parsing and/or compiling the code piece using an interpreter or a compiler (e.g., a Just-In-Time (JIT) compiler) if the code is not compiled, and running the code piece's startup code (e.g., if JavaScript is used, executing the global scope). In the case of a containerized process, preloading the on-demand code piece may include spinning up a new container, fetching the code piece (e.g., either from a local disk or from a remote storage location), and running the code piece's startup code.

Figure 1:
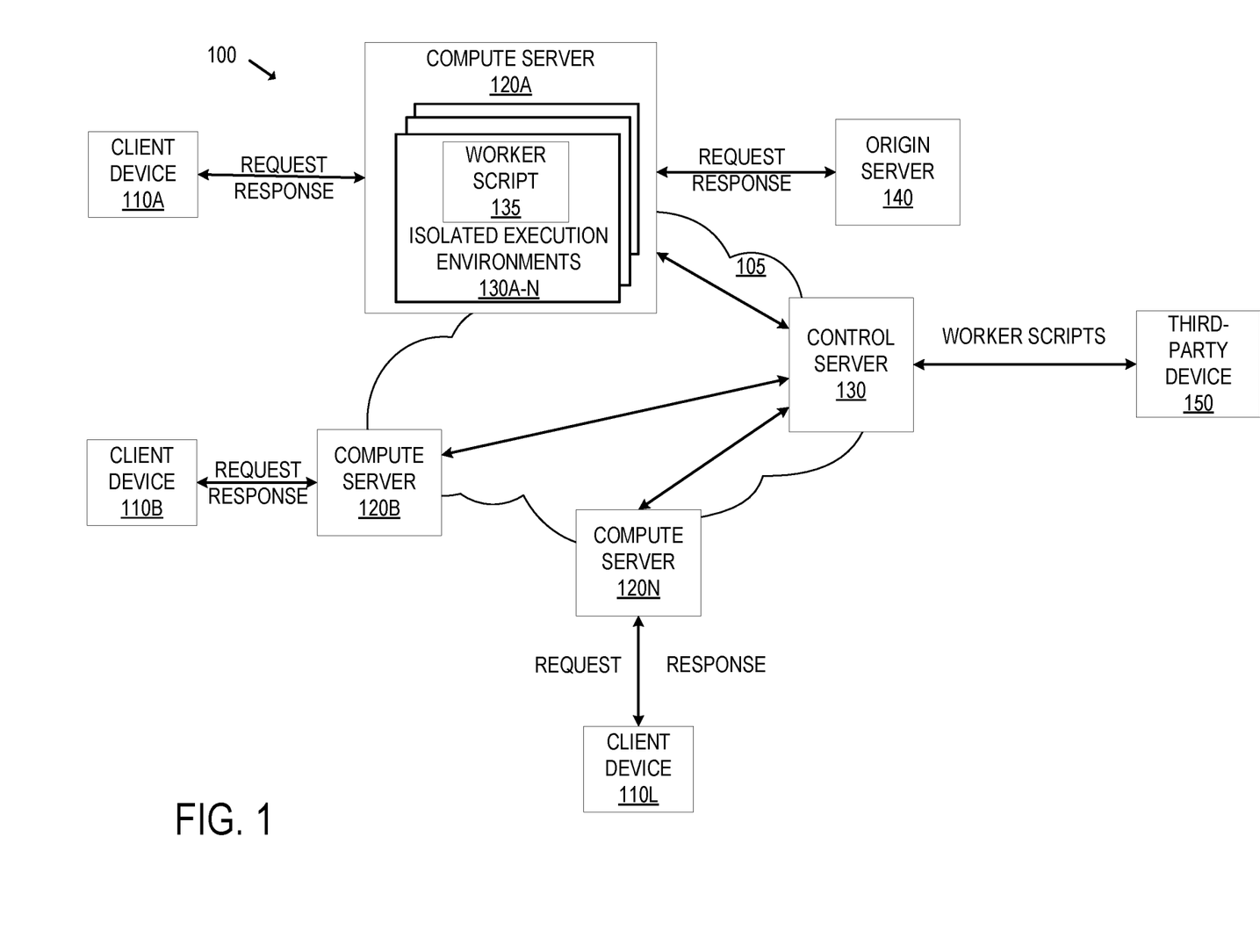
FIG. 1 illustrates an exemplary embodiment of a distributed cloud computing network that executes on-demand code pieces according to an embodiment.

FIG. 1 illustrates an exemplary embodiment of a distributed cloud computing network where on-demand code is preloaded according to an embodiment. The cloud computing platform provides different services such as protecting against internet-based threats, providing performance services for customers (e.g., acting as a content delivery network (CDN) and dynamically caching customer's files close to visitors, page acceleration, etc.), TCP stack optimizations, and/or other services. The system 100 includes the client devices 110A-N, the compute servers 120A-N, the control server 130, the origin server 140, and the third-party device 150.

Each client device is a computing device (e.g., laptop, workstation, smartphone, mobile phone, tablet, gaming system, set top box, wearable device, Internet of Things (IoT) device, etc.) that is capable of transmitting and/or receiving network traffic. Each client device may execute a client network application such as a web browser, native application, or other application that can access network resources (e.g., web pages, images, word processing documents, PDF files, movie files, music files, or other computer files).

The compute servers 120A-N are part of the distributed cloud computing network 105. The compute servers 120A-N are physical servers and are geographically distributed (e.g., in different locations throughout the world). There may be hundreds of compute servers as part of the cloud computing network. Although not illustrated in FIG. 1, the compute servers 120A-N may be part of PoPs that may include other physical servers (e.g., one or more compute servers, one or more control servers, one or more DNS servers (e.g., one or more authoritative name servers, one or more proxy DNS servers), and one or more other pieces of network equipment such as router(s), switch(es), and/or hub(s)). Each PoP (and each compute server) may be part of a different data center and/or colocation site. Although not illustrated in FIG. 1, there are other physical devices between the compute servers 120A-N such as routers, switches, etc.

The control server 130 is operated by the cloud computing platform and provides a set of tools and interfaces for a customer to, among other things, configure on-demand code to run in the cloud computing platform. For instance, the control server 130 may allow the customer to upload one or more worker scripts and may allow the customer to specify when the worker script(s) are to be run. For instance, the customer may associate a rule that indicates when a worker script is to be run. By way of example, the control server 130 may allow the customer to configure a URL matching pattern that indicates the URL(s) for which the worker script is to run. The control server 130 may allow the customer to delete and update previously uploaded worker script(s).

The control server 130 deploys worker scripts to the compute servers 120A-N automatically (without the customer selecting which of the compute servers 120A-N in which to deploy the worker script). In another embodiment, the control server 130 allows the customer to indicate which of the compute servers 120A-N are to be deployed a particular worker script. In an embodiment, the worker scripts are deployed to the compute servers 120A-N (at least to the selected ones of the compute servers) prior to receiving any request that triggers the execution of the worker scripts. In another embodiment, at least some of the worker scripts are not deployed to the compute servers 120A-N but rather kept in one or more central storage locations until the execution of that worker script is triggered.

The control server 130 creates an identifier for each unique worker script. In an embodiment, the identifier is created by hashing the content of the worker script (e.g., using a cryptographic hash function such as SHA-256), where two scripts with identical content will have the same identifier even if uploaded by different customers and even if applied to different zones.

In an embodiment, the control server 130 allows a customer to provision the service to the cloud computing network through DNS. For example, DNS record(s) of a customer are changed such that DNS records of hostnames point to an IP address of a compute server instead of the origin server. In some embodiments, the authoritative name server of the customer's domain is changed to an authoritative name server of the service and/or individual DNS records are changed to point to the compute server (or point to other domain(s) that point to a compute server of the service). For example, the customers may change their DNS records to point to a CNAME record that points to a compute server of the service. In one embodiment, customers may use the control server 130 to change their authoritative name server to an authoritative name server of the cloud computing platform and/or change their zone file records to have their domain point to the compute servers.

The third-party device 150 is a computing device (e.g., laptop, workstation, smartphone, mobile phone, tablet, etc.) that is used by third-parties to, among other things, configure their on-demand code pieces to run in the cloud computing platform. A third-party may be a customer of the cloud computing platform and/or a party that is configuring on-demand code to run in the cloud computing platform.

The origin server 140, which may be owned or operated directly or indirectly by the customer of the cloud computing network, is a computing device on which a network resource resides and/or originates (e.g., web pages, images, word processing documents, PDF files, movie files, music files, or other computer files). In an embodiment, the origin server 140 is not required to be in the cloud computing platform (e.g., on-demand code may run on the compute servers without communicating with an origin server). Although FIG. 1 illustrates the origin server 140 communicating with the compute server 120A, the origin server 140 may also communicate with one or more of the other compute servers 120B-N.

The compute servers 120A-N are geographically distributed which decreases the distance between requesting client devices and the compute servers and decreases the time necessary to respond to a request. The compute servers 120A-N may operate as a reverse proxy and receive request for network resources (e.g., HTTP requests) of a domain of the origin server 140. The particular compute server 120 that receives a request from a client device may be determined by the network infrastructure according to an anycast implementation or by a geographical load balancer. For instance, the compute servers 120A-N may have a same anycast IP address for a domain of the origin server 140. If the origin server 140 handles the domain "example.com", a DNS request for "example.com" returns an address record having the anycast IP address of the compute servers 120A-N. Which one of the compute servers 120A-N receives a request from a client device depends on which compute server 120 is closest to the client device in terms of routing protocol configuration (e.g., Border Gateway Protocol (BGP) configuration) according to an anycast implementation as determined by the network infrastructure (e.g., router(s), switch(es), and/or other network equipment between the requesting client and the compute servers 120A-N. By way of example, the client device 110A is closest to the compute server 120A, the client device 110B is closest to the compute server 120B, and the client device 110L is closest to the compute server 120N. Accordingly, requests from the client device 110A are received at the compute server 120A, requests from the client device 110B are received at the compute server 120B, and requests from the client device 110L are received at the compute server 120N. In some embodiments, instead of using an anycast mechanism, a geographical load balancer is used to route traffic to the nearest compute server. The number of client devices and compute servers illustrated in FIG. 1 is exemplary. The distributed cloud computing network 105 may include hundreds to thousands (or more) compute servers and each compute server may receive requests from thousands or more client devices.

In the example of FIG. 1, each of the compute servers 120A-N can execute on-demand code pieces (worker scripts). In an embodiment, each worker script is run in an isolated execution environment, such as run in an isolate of the V8 JavaScript engine. Thus, as illustrated in FIG. 1, the compute server 120A includes the isolated execution environments 130A-N that each executes a separate worker script 135. The isolated execution environment 130A-N are run within a single process. In the example of FIG. 1, the worker scripts are not executed using a virtual machine or a container. In an embodiment, the compute servers 120A-N preload a particular on-demand code piece upon receiving an indication that a request that will trigger the execution of that on-demand code piece will be imminently received. The execution of an on-demand code piece is on-demand (when and only if it is needed) at a particular compute server of the distributed cloud computing network, in an embodiment. Each request for a domain that triggers handling of a worker script will be handed by the worker at the compute server that is closest to the requesting user.

Figure 2:
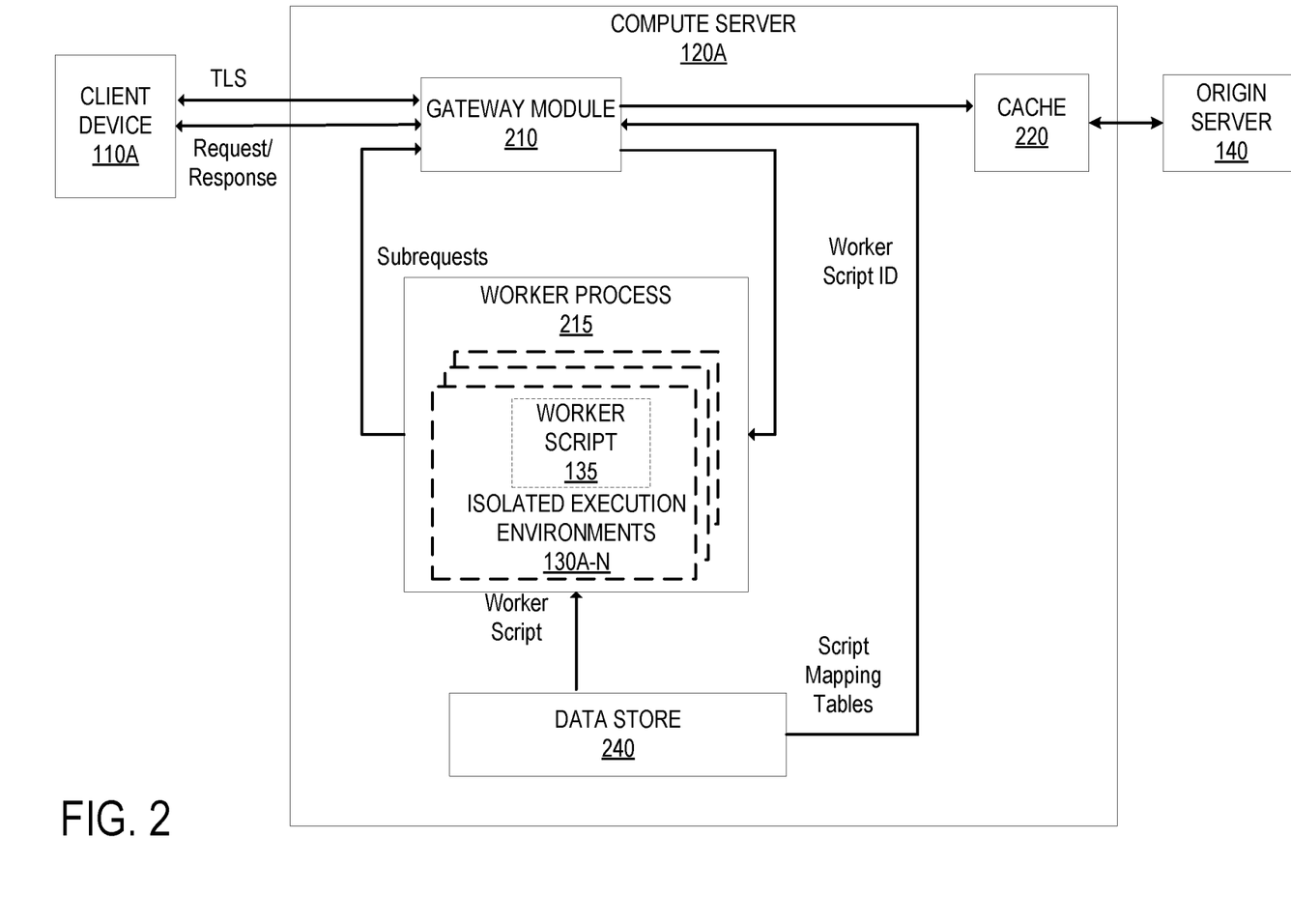
FIG. 2 illustrates an example of a compute server according to an embodiment.

FIG. 2 illustrates an example of a compute server 120 that preloads on-demand code pieces according to an embodiment. The compute server 120A includes a gateway module 210, a worker process 215, a cache 220, and a data store 240.

The gateway module 210 receives web requests and processes web responses (e.g., HTTP requests and HTTP responses). The gateway module 210 may be acting as a reverse proxy for the origin server 140. The gateway module 210 has access to the cache 220 that is configured to cache network resources (e.g., web pages, images, word processing documents, PDF files movie files, music files, or other computer files), configuration files, scripts, and/or other computer files. The data store 240 is configured to store, among other items, the worker scripts that are received from the control server 130, the URL matching pattern rule that indicates the URL(s) for which the worker script is to run, and a worker script mapping that maps worker script identifiers to URL matching patterns.

The worker process 215 is a single process that executes the isolated execution environments 130A-N. There may be hundreds to thousands of isolated execution environments that are run simultaneously by the worker process 215. Each different worker script 135 is run by a different one of the isolated execution environments 130A-N each with its own heap. The worker process 215 starts an isolated execution environment when preloading a particular worker script (or on the first use of the worker script if not preloaded). Depending on the complexity of the worker script, preloading the worker script may take approximately tens to hundreds of milliseconds of CPU time. A worker script stays loaded in memory between requests so that the worker script can be used to respond quickly when a new request that triggers that worker script arrives. Handling a single request for a worker script that is already loaded typically takes a fraction of a millisecond of CPU time depending on the complexity of the worker script. In an embodiment, one isolated execution environment is created per unique worker script identifier. Thus, if many zones use identical worker scripts, memory is saved by compiling the script only once. The worker process 215 evicts worker scripts (e.g., in a least recently used fashion). The worker process 215 may be started during booting of the compute server 120A or when the first worker script is preloaded and/or triggered for execution.

As previously described, in an embodiment the compute server 120A determines whether to preload a particular on-demand code piece based on receiving an indication of a hostname through the TLS handshake (e.g., through the SNI or ESNI extension). In such an embodiment, the gateway module 210 terminates TLS connections and establishes a TLS connection with client devices. As part of the TLS handshake, the gateway module 210 may receive an indication of a hostname through SNI or ESNI. For instance, the TLS client_hello handshake message received from the client device 110A may indicate the hostname in an SNI extension. In an embodiment, upon receiving an indication of a hostname through the TLS handshake such as through SNI or ESNI, the gateway module 210 determines whether an on-demand code piece is mapped to that hostname (e.g., the root path of the hostname). If the hostname is mapped to an on-demand code piece, then the gateway module 210 may create a preloading request that is annotated with the identifier of the on-demand code piece as determined by a script mapping table and forwards the preloading request to the worker process 215. The preloading request is not a request from a client for content. If the identified worker script is already loaded (e.g., if there is already an isolated execution environment running an instance of the worker script), the worker process 215 does not need to load another instance of the worker script. However, if the identified worker script that is already loaded is from a different zone (which is probably from a different customer), the worker process 215 creates a separate context (a global object) for the worker script so that each zone has its own isolated global state. That prevents zones from interfering with the state of other zones. If the identified worker script is not already loaded, the worker process 215 creates an isolated execution environment, fetches the code piece (e.g., either from a local disk or from a remote storage location), parses and/or compiles the code piece using an interpreter or a compiler (e.g., a Just-In-Time (JIT) compiler) if the code is not compiled, and runs the code piece's startup code (e.g., if JavaScript is used, executing the global scope).

In many cases, the time it takes to preload the worker script for execution is less than the time necessary to complete the TLS handshake. Accordingly, when a request (e.g., an HTTP request) is received from the client device 110A for a resource at the hostname, the mapped on-demand code piece is loaded for execution thereby reducing or eliminating any cold-start delay.

Although the SNI/ESNI extension provides the hostname, it does not provide the full path of the corresponding request. For instance, the SNI/ESNI extension may indicate "example.com" as the hostname, but the following HTTP request may have the full path "example.com/images/dog.png". In some cases, there may be multiple on-demand code pieces that are mapped to the hostname. For instance, for the hostname "example.com", there may be an on-demand code piece mapped to the root path "example.com", and/or one or more on-demand code pieces mapped to other paths such as "example.com/images/*" and "example.com/blog/*". In an embodiment, if there are multiple on-demand code pieces that are mapped to the hostname, the compute server 120A preloads each of the matching on-demand code pieces. In another embodiment, if there are multiple on-demand code pieces that are mapped to the hostname, the compute server 120A preloads X number of on-demand code pieces based on popularity of the on-demand code pieces (e.g., which on-demand code piece(s) is most executed over a predefined time period), where X is greater than one. In another embodiment, the customer provides an indication on which one or more multiple on-demand code pieces are to be preloaded. In another embodiment, if there is a hostname mapped to the root path, only that on-demand code piece is preloaded.

In an embodiment, a preloading request is made responsive to each new indication of a hostname through the TLS handshake and the worker process 215 determines whether to preload an on-demand code piece. In another embodiment, the gateway module 210 stores a list of the recently prewarmed hostnames and does not make a preloading request for a hostname if it is on the list. In another embodiment, the gateway module 210 may set a time to live (TTL) for each prewarmed hostname and only send a preloading request if the TTL has expired.

In an embodiment, in addition to preloading the on-demand code piece, one or more other resources are prefetched for the hostname. For instance, for some on-demand code pieces, it is possible to determine what resource(s) the code piece commonly fetches. In such a case, those resource(s) can be prefetched such that they are available in the cache 220 of the compute server 120A before an actual request for those resources is made. As another example, the on-demand code piece itself may specify one or more resources to prefetch. In such a case, those resource(s) are prefetched (e.g., requested from their source) such that they are available in cache of the compute server 120A.

In an embodiment, in addition to preloading the on-demand code piece, one or more other site-specific information is prefetched for the hostname. For instance, configuration settings for the hostname can be preloaded. These configuration settings can be used for caching (e.g., instructing what resources to cache), rate limiting, page rules (e.g., customizing responses based on request URL), web application firewall (WAF) rules, or other configuration settings related to the services provided by the distributed cloud computing network. As another example, the compute server 120A may maintain a list of resources (e.g., HTTP resources) that are commonly requested for the hostname and fetch those resources from the origin to populate the cache 220. As another example, if the on-demand code piece calls another on-demand code piece (e.g., an API call to another on-demand code piece), that other on-demand code piece may also be preloaded.

Although an embodiment is described that uses the hostname indication through SNI as the trigger to preload an on-demand code piece, other information that provide an indication that a request (e.g., an HTTP request) for the hostname that will trigger the execution of an on-demand code piece will be received can also be used as the trigger to preload an on-demand code piece. For instance, if there is a unique mapping from an IP address(es) to a hostname, the receipt of an IP packet before a request for content (e.g., an HTTP request) can be used to trigger the preloading of an on-demand code piece. For instance, the destination IP address of the IP packet can correspond to a hostname that can be used to trigger the execution of the on-demand code piece. These IP packets can include a SYN packet (the first message in the 3-way handshake to establish a TCP connection, an ACK packet (the last message in the 3-way handshake), and/or a TLS client_hello packet.

As another example, a DNS lookup may be used as a trigger to preload an on-demand code piece. For instance, a DNS query for a hostname (e.g., an A or AAAA record query) may be received at a DNS server of the PoP and the queried hostname can trigger the preloading of the on-demand code piece. The indication of the queried hostname can be sent to all or selected ones of the compute servers within the PoP to trigger preloading the on-demand code piece at those compute server(s).

In at least some cases, the gateway module 210 receives a request (e.g., an HTTP request) for the hostname soon after preloading the on-demand code piece (and optionally other information) for that hostname. The request includes the path which may be different from the root hostname. The gateway module 210 processes the request including determining whether the request triggers execution of an on-demand code piece. For instance, the gateway module 210 analyzes the request URL against the URL matching pattern configured for the zone to determine if a worker script is to be executed. Although the on-demand code piece may be preloaded for the hostname, it is possible that an on-demand code piece may not be triggered for execution for the full path received in the request. If a worker script is to be executed, the gateway module 210 annotates the request with the identifier of the worker script to be executed as determined by the script mapping table and forwards the request to the worker process 215. If the identified worker script is already loaded, which may have occurred due to the preloading of the worker script (if there is already an isolated execution environment running an instance of the worker script), the worker process 215 does not need to load another instance of the worker script. However, if the identified worker script that is already loaded is from a different zone (which is probably from a different customer), the worker process 215 creates a separate context (a global object) for the worker script so that each zone has its own isolated global state. That prevents zones from interfering with the state of other zones. The gateway module 210 generates the response after the worker script(s) are executed. If the identified worker script is not loaded, the worker process 215 creates an isolated execution environment, fetches the code piece (e.g., either from a local disk or from a remote storage location), parses and/or compiles the code piece using an interpreter or a compiler (e.g., a Just-In-Time (JIT) compiler) if the code is not compiled, and runs the code piece's startup code (e.g., if JavaScript is used, executing the global scope). The worker script is then executed.

The executed worker script can take various actions depending on how the script is written. The worker script may make one or more further requests (referred herein as "subrequests") such as additional HTTP requests. These subrequests may be destined for the origin server 140 or to other destinations on the internet. The worker process 215 sends the subrequests back to the gateway module 210 for further processing. The gateway module 210 is configured to prevent the subrequest from looping back to the same worker script. But the subrequest may trigger a different worker script potentially from a different zone. If the subrequest is to the same zone, the gateway module 210 transmits the subrequest to the origin server 140 for processing and receives the response from the origin server 140. If the subrequest triggers a worker script, the gateway module 210 annotates the request with the identifier of the worker script to be executed as determined by the script mapping table and forwards the request to the worker process 215 for executing the script.

Thus, a single request can trigger multiple worker scripts, even from different zones from different customers, to be run. Since the worker scripts are run on the same physical compute server, network latency to execute these scripts reduces to zero. Further, there is savings in bandwidth because the different origin zones may not need to be contacted. To provide an example, say a customer has a service where a user can make a purchase by an SMS message. The user sends an SMS message to make the purchase where the SMS message is handled by an API of a first third-party provider that generates an event to a function. That function invokes a payment API of a second third-party provider to charge the user's credit card, which generates an invoice event that is handled by a function to email the invoice to the user. Each of these transactions involve potentially crossing the internet, incurring latency and bandwidth charges. In contrast, with embodiments described herein, the API of the first third-party provider and the API of the second third-party provider can be implemented as worker scripts and executed on the same physical compute server, reducing latency and bandwidth.

The worker scripts can perform many different actions. By way of example, the worker scripts may perform one or more of the following: intercept and modify HTTP request and response URLs, status, headers, and body content; respond to requests directly from the worker script or forward the request elsewhere; send HTTP requests to third-party servers; send multiple requests, in serial or in parallel, and use the responses to compose a final response to the original request; send asynchronous requests after the response has already been returned to the client (for example, for logging or analytics); and control behavior such as caching behavior. A customer may perform one or more of these actions to do the following, for example: perform AB testing between two different back-ends; build "serverless" applications that rely entirely on web APIs; create custom security filters to block unwanted traffic; rewrite requests to improve cache hit rate; implement custom load balancing and failover logic; and/or collecting analytics without running code in the user's browser. Of course, these are just examples and the worker scripts can be used to perform other actions.

Figure 3:
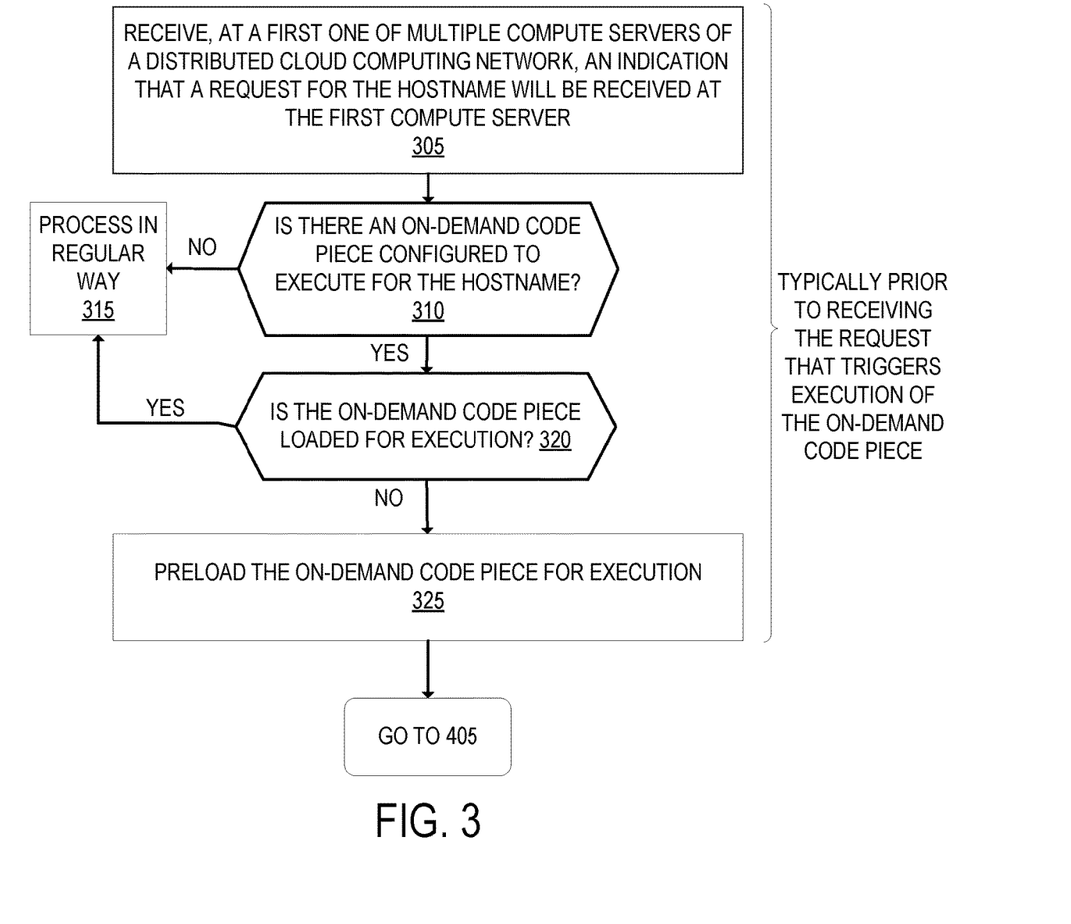
FIG. 3 is a flow diagram that illustrates exemplary operations for preloading on-demand code pieces in a distributed cloud computing network according to an embodiment.

FIG. 3 is a flow diagram that illustrates exemplary operations for preloading on-demand code pieces in a distributed cloud computing network according to an embodiment. The operations of FIG. 3 are described with respect to the exemplary embodiment of FIG. 1. However, the operations of FIG. 3 can be performed by different embodiments than those of FIG. 1, and the embodiment described in FIG. 1 can perform operations different than those of FIG. 3. The operations of FIG. 3 will be described with respect to HTTP/S request and responses. But the operations of FIG. 3 can be performed with different types of requests and responses.

At operation 305, a first one of multiple compute servers of a distributed cloud computing network receives an indication that a request for content at a hostname will be received at the first compute server. The request may be an HTTP request, for example. In an embodiment, the indication of the hostname is received during the TLS handshake such as through SNI or ESNI of an incoming TLS connection establishment from a client device. The request is typically received immediately after the TLS handshake and the time depends largely on the client's latency to the compute server but may be between 5-500 ms after the TLS handshake is complete. In another embodiment, the indication of the hostname is received through mapping the destination IP address of an incoming IP packet from a client device (e.g., an initial SYN packet, an initial ACK packet, or a TLS client_hello packet). In another embodiment, the indication of the hostname is received through a DNS lookup of the hostname.

Next, at operation 310, the first compute server determines whether there is an on-demand code piece that is configured to execute responsive to the first compute server receiving a request (e.g., an HTTP request) for the indicated hostname. For example, the first compute server determines whether the hostname is mapped to an on-demand code piece. As previously described, in some cases, there may be multiple on-demand code pieces that are mapped to the hostname. For instance, for the hostname "example.com", there may be an on-demand code piece mapped to the root path "example.com", and/or one or more on-demand code pieces mapped to other paths such as "example.com/images/*" and "example.com/blog/*". In an embodiment, the first compute server preloads only the on-demand code piece that is mapped to the root path and not to a more specific path (e.g., mapped to the root path "example.com" and not to "example.com/images/*"). If there is not an on-demand code piece that is configured to execute responsive to the first compute server receiving a request for the indicated hostname, then operation 315 is performed where the first compute server processes in its regular way and it does not preload an on-demand code piece. If there is an on-demand code piece that is configured to execute responsive to the first compute server receiving a request for the indicated hostname, then operation 320 is performed.

At operation 320, the first compute server determines whether the on-demand code piece is already loaded for execution. In an embodiment, the first compute server determines whether an isolated execution environment running an instance of the on-demand code piece is already running. If the on-demand code piece is already loaded for execution, then operation 315 is performed where the first compute server continues processing in its regular way and does not preload the on-demand code piece. If the on-demand code piece is not loaded for execution, then operation 325 is performed.

At operation 325, the first compute server preloads the on-demand code piece for execution. In an embodiment, the first compute server creates an isolated execution environment, fetches the code piece (e.g., either from a local disk or from a remote storage location), parses and/or compiles the code piece using an interpreter or a compiler (e.g., a Just-In-Time (JIT) compiler) if the code is not compiled, and runs the code piece's startup code (e.g., if JavaScript is used, executing the global scope).

The on-demand code piece may not be executed until a request is received that triggers the execution of that code piece. The isolated execution environment may be one of many isolated execution environments that are executed by a single process of the first compute server. Multiple other code pieces may be executed by the single process in multiple other isolated execution environments respectively. Code in one isolated execution environment cannot interfere with code running in a different execution environment despite being in the same process. The isolated execution environment is managed in user-space rather than by an operating system. Data cannot be shared or moved across isolated execution environments (each isolated execution environment has a completely separate state). The single process on the compute server can run multiple isolated execution environments (e.g., hundreds to thousands) and seamlessly switch between them. Each isolated execution environment uses its own mechanism to ensure safe memory access, such as preventing the code from requesting access to arbitrary memory (restricting its use to the objects it has been given) and/or interpreting pointers within a private address space that is a subset of an overall address space.

In most cases, the operations of FIG. 3 are completed prior to the compute server receiving the content request (e.g., the HTTP request) from the client device that triggers the execution of the on-demand code piece. To say it another way, after receiving the trigger to preload the on-demand code piece, the on-demand code piece is typically preloaded and ready for execution prior to receiving a request that actually triggers the execution of the code piece. Thus, when a request is received that triggers the execution of the on-demand code piece, that code piece is already loaded for execution thereby reducing or eliminating any cold-start delay.

Although not illustrated in FIG. 3, in an embodiment, in addition to preloading the on-demand code piece, one or more other resources are prefetched for the hostname. For instance, for some on-demand code pieces, it is possible to determine what resource(s) the code piece commonly fetches. In such a case, those resource(s) can be prefetched such that they are available in the cache of the compute server before an actual request for those resources is made. As another example, the on-demand code piece itself may specify one or more resources to prefetch. In such a case, those resource(s) are prefetched (e.g., requested from their source) such that they are available in cache of the compute server. In an embodiment, in addition to preloading the on-demand code piece, one or more other site-specific information is prefetched for the hostname. For instance, configuration settings for the hostname can be preloaded. These configuration settings can be used for caching (e.g., instructing what resources to cache), rate limiting, page rules (e.g., customizing responses based on request URL), web application firewall (WAF) rules, or other configuration settings related to the services provided by the distributed cloud computing network. As another example, the compute server may maintain a list of resources (e.g., HTTP resources) that are commonly requested for the hostname and fetch those resources from the origin to populate the cache. As another example, if the on-demand code piece calls another on-demand code piece (e.g., an API call to another on-demand code piece), that other on-demand code piece may also be preloaded.

Typically, soon after preloading an on-demand code piece, a request that may trigger the execution of the on-demand code piece is received at the first server. Thus, operations move from operation 325 to operation 405 of FIG. 4.

Figure 4:
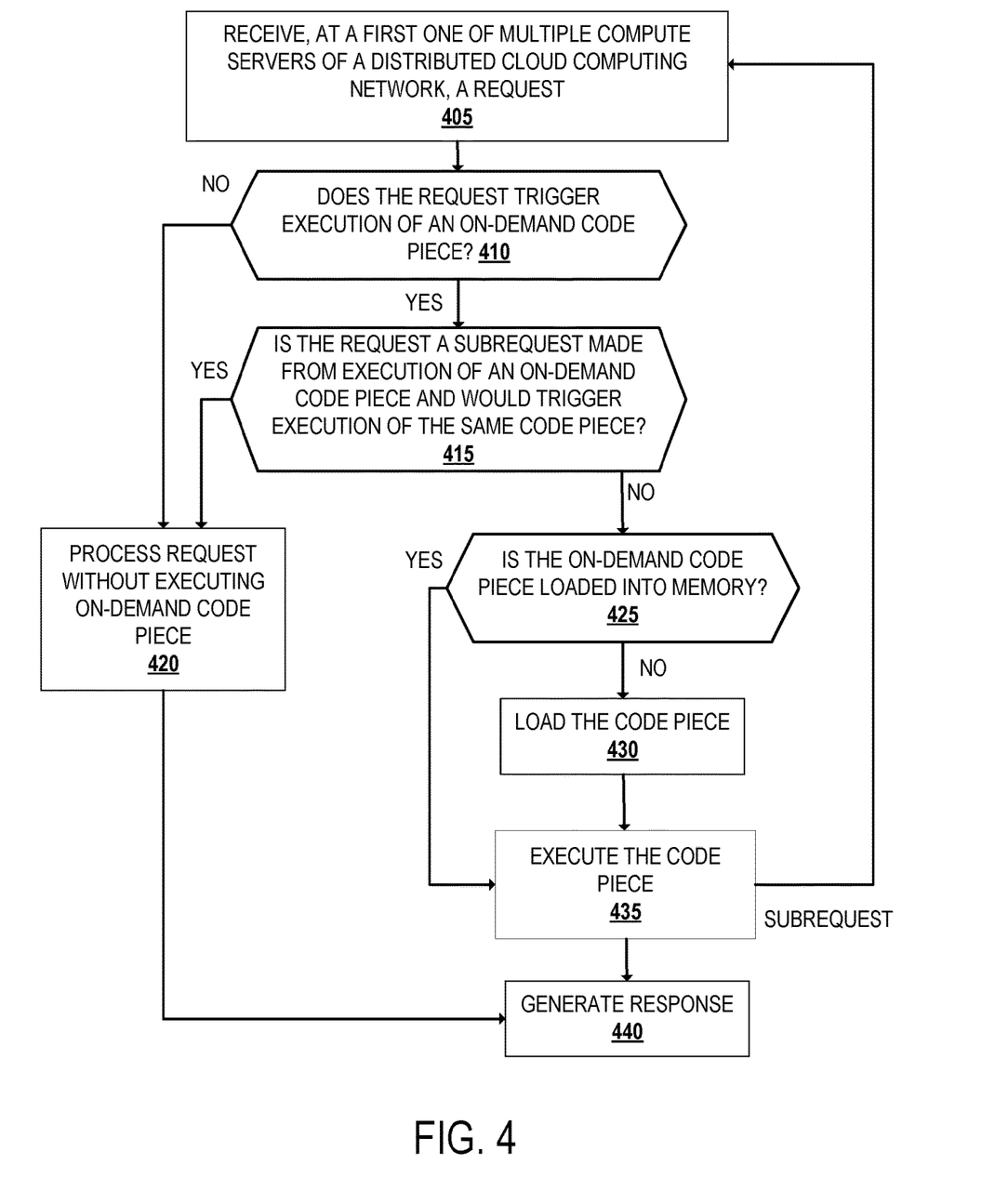
FIG. 4 is a flow diagram that illustrates exemplary operations for executing on-demand code pieces in a distributed cloud computing network according to an embodiment.

FIG. 4 is a flow diagram that illustrates exemplary operations for executing on-demand code pieces in a distributed cloud computing network according to an embodiment. The operations of FIG. 4 are described with respect to the exemplary embodiment of FIGS. 1 and 2. However, the operations of FIG. 4 can be performed by different embodiments than those of FIGS. 1 and 2, and the embodiment described in FIGS. 1 and 2 can perform operations different than those of FIG. 4. The operations of FIG. 4 will be described with respect to HTTP/S request and responses. But the operations of FIG. 4 can be performed with different types of requests and responses.

At operation 405, a first one of multiple compute servers of a distributed cloud computing network receives a request. The request may be received from a client device and be an HTTP or HTTPS request, for example, destined for a zone. In an embodiment, the compute server receives the request out of the multiple compute servers because it has been determined to be the closest to the requesting client device as determined by an anycast implementation. Instead of the request being received from an external client device, the request could be received as a subrequest sent by an on-demand code piece. If a subrequest, the subrequest may identify the on-demand code piece that generated the subrequest (e.g., it may include the identifier of the on-demand code piece). With respect to FIG. 2, the gateway module 210 receives the request.

Next at operation 410, the gateway module 210 determines whether the request triggers execution of an on-demand code piece. The gateway module 210 may determine that the request triggers execution of an on-demand code piece by matching the zone to a predetermined matching pattern that associates the on-demand code piece to the predetermined matching pattern. For instance, the gateway module 210 may analyze the request URL against a URL matching pattern configured for the zone to determine if an on-demand code piece is to be executed and if so, which on-demand code piece.

Assuming that the request received in operation 405 is for a hostname for which an on-demand code piece has been preloaded, it is likely that the request will trigger the execution of that on-demand code piece. However, in some cases even though an on-demand code piece was preloaded for the hostname, the request URL will not trigger the execution of that on-demand code piece. For instance, a different on-demand n code piece may be mapped to the specific request URL path as compared to the on-demand code piece mapped to the root path. In such a case, this different on-demand code piece may not be preloaded. As another example, the customer may configure a URL matching rule that is not associated with any on-demand code piece. In such a case, even though the root path may be mapped to an on-demand code piece, the specific request URL may not be mapped to an on-demand code piece. If the request does not trigger execution of an on-demand code piece, then operations move to operation 420. If the request triggers execution of an on-demand code piece, then operations move to operation 415.

The gateway module 210 is configured to prevent a subrequest from looping back to the same on-demand code piece. Thus, at operation 415, the gateway module 210 determines if the request is from a subrequest made from execution of an on-demand code piece and would trigger execution of the same on-demand code piece. For example, the gateway module 210 determines whether the request identifies the on-demand code piece as generating the request and determines whether the request triggers execution of the same on-demand code piece using the predetermined matching pattern. If the request is a subrequest and would trigger execution of the same on-demand code piece, then flow moves to operation 420. Otherwise, flow moves to operation 425.

At operation 420, the request is processed without executing an on-demand code piece. The request may be processed differently depending on the destination of the request and the requester. For instance, if the request is for a web page from a client device, the gateway module 210 may access the web page and/or the resource(s) of the web page from the cache 220 (if available) and/or from the origin server of the domain of the web page. If the request is from an on-demand code piece (a subrequest), the gateway module 210 processes the request and response and returns the data to the on-demand code piece for further processing. After processing the request, flow moves to operation 440 for generating the response.

In an embodiment, on-demand code pieces stay loaded in memory between requests so that they can be used to respond quickly when a new request arrives that triggers the on-demand code piece. An on-demand code piece may be run separately per zone. Each different zone running the same on-demand code piece may be put in a separate context (have their own global object) within the same isolated execution environment running that on-demand code piece so each zone has its own isolated global state. This prevents two different zones from interfering with the states of each other while allowing the contexts to share resources.

At operation 425, the gateway module 210 determines whether the on-demand code piece is loaded into memory. If the on-demand code piece is loaded (e.g., if there is already an isolated execution environment running for the on-demand code piece for the zone), the on-demand code piece is executed in operation 435. If the on-demand code piece is not loaded, then at operation 430 the on-demand code piece is loaded and then the on-demand code piece is executed in operation 435.

The on-demand code piece can take various actions depending on how the code is written. The on-demand code piece may make one or more subrequests that can be destined for an origin server of the zone of the on-demand code piece or to other destinations on the internet. As illustrated in FIG. 4, if executing the code piece 435 causes a subrequest to be generated, the subrequest is received at the gateway module 210 in operation 405. The subrequest identifies the on-demand code piece that generated the subrequest. The result of the subrequest may be processed by the code piece.

At operation 440, a response is generated. The response may be an HTTP response, for example. If an on-demand code piece was executed, the content of the response depends on the execution of that on-demand code piece. The response is sent to the requesting client.

Figure 5:
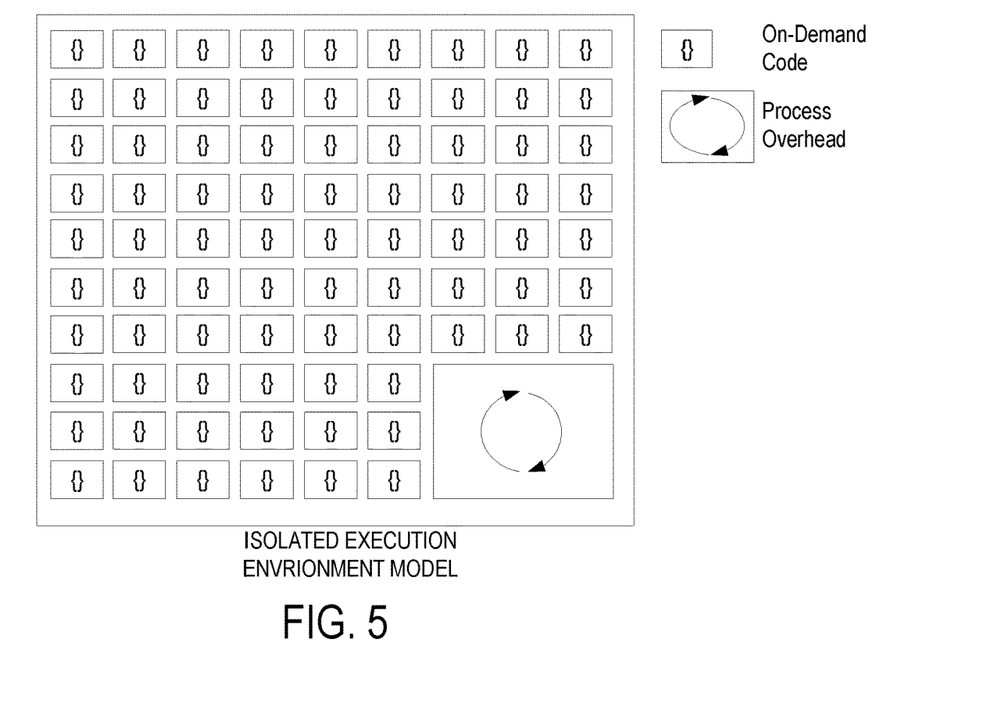
FIG. 5 is a conceptual figure that shows a conceptual relationship between on-demand code and the process overhead of the isolated execution environment model that is described in embodiments.
Figure 6:
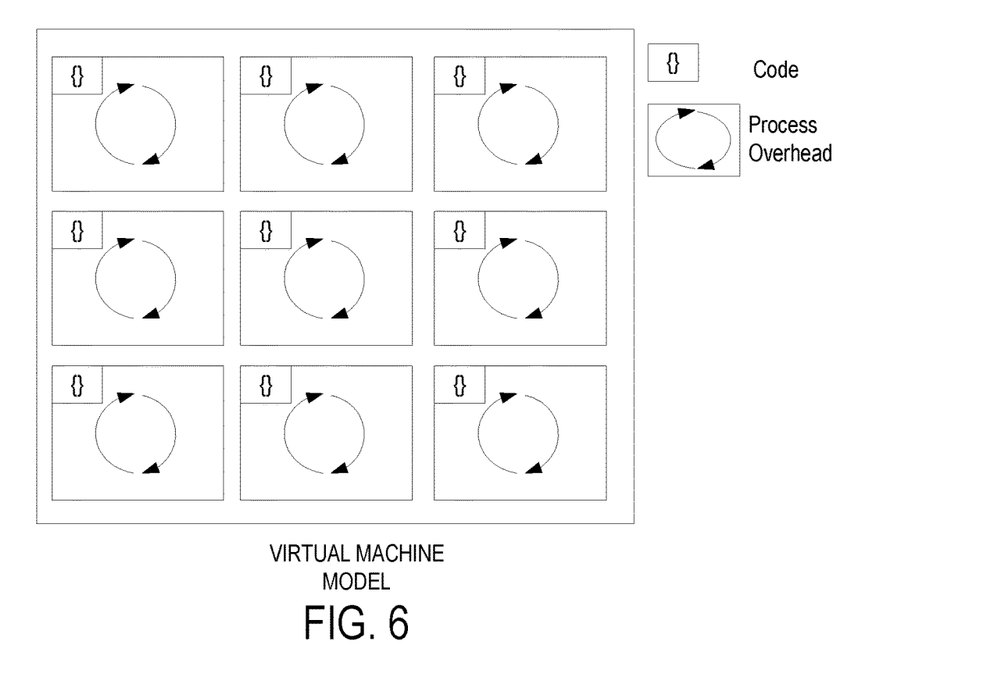
FIG. 6 is a conceptual figure that shows a conceptual relationship between code and the process overhead of a virtual machine model.

Running on-demand code pieces in isolated execution environments improves the performance as compared with running code using a virtual machine or a container. Unlike other computing platforms that spin up a containerized process for processing code that can take as much as ten seconds, an isolated execution environment can be started in as little as 5 ms because a new process does not need to be started. Thus, the overhead of running an isolated execution environment is small as compared to other computing platforms. Further, since the on-demand code can be run in a single process, there are no expensive context switches like experienced with other computing platforms which means that more time is spent actually running the code instead of performing context switches. FIG. 5 is a conceptual figure that shows a conceptual relationship between on-demand code and the process overhead of the isolated execution environment model that is described in embodiments herein. FIG. 6 is a conceptual figure that shows a conceptual relationship between on-demand code and the process overhead of a virtual machine model. As seen in FIGS. 5 and 6, the process overhead of the virtual machine model is experienced for each different code piece (a new process has to be started for each different code piece), whereas the process overhead of the isolated execution environment model is experienced once.

Although embodiments have described preloading on-demand code pieces prior to receiving HTTP requests, in some embodiments on-demand code pieces are preloaded for different protocols. For instance, in case a DNS lookup is used as the trigger to preload an on-demand code piece, the protocol that can be used by the client to trigger the execution of the on-demand code piece can be different than HTTP such as SMTP, SSH, IRC, etc.

Figure 7:
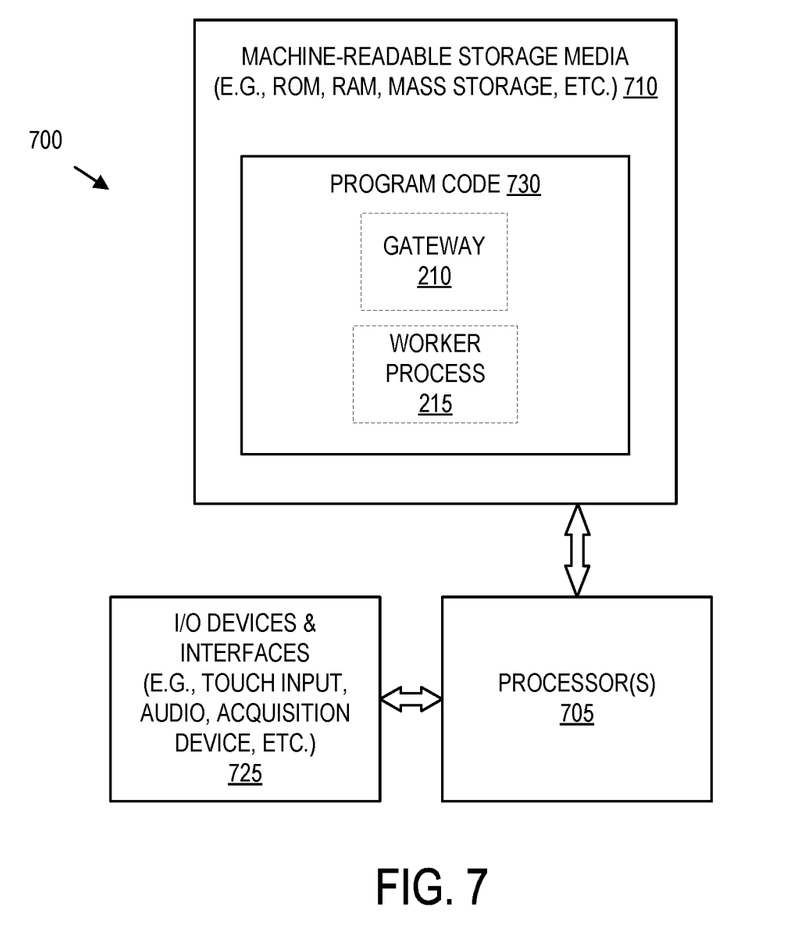
FIG. 7 illustrates a block diagram for an exemplary data processing system that may be used in some embodiments.

FIG. 7 illustrates a block diagram for an exemplary data processing system 700 that may be used in some embodiments. Data processing system 700 includes one or more processors 705 and connected system components (e.g., multiple connected chips). One or more such data processing systems 700 may be utilized to implement the embodiments and operations described with respect to the compute server, control server, or other electronic device.

The data processing system 700 is an electronic device which stores and transmits (internally and/or with other electronic devices over a network) code (which is composed of software instructions and which is sometimes referred to as computer program code or a computer program) and/or data using machine-readable media (also called computer-readable media), such as machine-readable storage media 710 (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals), which is coupled to the processor(s) 705. For example, the depicted machine-readable storage media 710 may store program code 730 that, when executed by the processor(s) 705, causes the data processing system 700 to execute the gateway module 210 and/or the worker process 215.

The data processing system 700 also includes one or more input or output ("I/O") devices and interfaces 725, which are provided to allow a user to provide input to, receive output from, and otherwise transfer data to and from the system.

These I/O devices 725 may include a mouse, keypad, keyboard, a touch panel or a multi-touch input panel, camera, frame grabber, optical scanner, an audio input/output subsystem (which may include a microphone and/or a speaker), other known I/O devices or a combination of such I/O devices. The I/O devices and interfaces 725 may include wireless transceivers, such as an IEEE 802.11 transceiver, an infrared transceiver, a Bluetooth transceiver, a wireless cellular telephony transceiver (e.g., 2G, 3G, 4G, 5G), an NFC transceiver, or another wireless protocol to connect the data processing system 700 with another device, external component, or a network and receive stored instructions, data, tokens, etc. For instance, a wired or wireless transceiver may transmit and receive messages to and from the compute server as described herein.

Additional components, not shown, may also be part of the system 700, and, in certain embodiments, fewer components than that shown in FIG. 7 may also be used in a data processing system 700. One or more buses may be used to interconnect the various components shown in FIG. 7.

Thus, an electronic device (e.g., a computer or a mobile client device) includes hardware and software, such as a set of one or more processors coupled to one or more machine-readable storage media to store code for execution on the set of processors and/or to store data. For instance, an electronic device may include non-volatile memory containing the code since the non-volatile memory can persist the code even when the electronic device is turned off, and while the electronic device is turned on that part of the code that is to be executed by the processor(s) of that electronic device is copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

The techniques shown in the figures can be implemented using code and data stored and executed on one or more computing devices (e.g., client device, compute server, DNS server, control server, origin server, etc.). Such computing devices store and communicate (internally and/or with other computing devices over a network) code and data using machine-readable media, such as non-transitory machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such computing devices typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given computing device typically stores code and/or data for execution on the set of one or more processors of that computing device. Of course, one or more parts of an embodiment of the invention may be implemented using different combinations of software, firmware, and/or hardware.

In the preceding description, numerous specific details are set forth. However, it is understood that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method, comprising:
    receiving, at a first one of a plurality of compute servers of a distributed cloud computing network, an indication of a hostname in a Transport Layer Security (TLS) handshake message from a client device;
    determining that a first one of a plurality of on-demand code pieces is configured to execute on the first compute server responsive to receiving an HTTP request for the hostname, wherein the first on-demand code piece is not loaded for execution on the first compute server at a time of receiving the indication of the hostname received in the TLS handshake message;
    responsive to the determining and prior to receiving the HTTP request for the hostname,
        determining that the first on-demand code piece is not already loaded for execution on the first compute server, and
        preloading the first on-demand code piece for execution on the first compute server;
    receiving, at the first compute server, an HTTP request from the client device for the hostname that triggers execution of the preloaded first on-demand code piece;
    executing the preloaded first on-demand code piece;
    generating a response to the HTTP request based at least in part on the executed preloaded first on-demand code piece; and
    transmitting the generated response to the client device.

2. The method of claim 1, wherein the indication of the hostname is received through a Server Name Indication (SNI) extension or an Encrypted Server Name Indication (ESNI) extension of a TLS client hello message.

3. The method of claim 1, further comprising:
wherein the executing the preloaded first on-demand code piece is done by a single process at the first one of the plurality of compute servers; and
wherein preloading the first on-demand code piece for execution on the first compute server includes creating a first one of a plurality of isolated execution environments and loading the first on-demand code piece in memory of the first compute server, and wherein each of the other plurality of on-demand code pieces are run in the other plurality of isolated execution environments respectively and executed by the single process.

4. The method of claim 1, wherein executing the first on-demand code piece causes a subrequest to be generated and transmitted to an origin server of the hostname.

5. The method of claim 1, wherein generating the response is performed without transmitting a request to an origin server of the hostname.

6. The method of claim 1, wherein the first on-demand code piece is provided by an owner or operator of the hostname.

7. The method of claim 1, further comprising:
wherein executing the first on-demand code piece causes a subrequest to be generated that triggers execution of a second one of the plurality of on-demand code pieces;
executing, at the first compute server, the second one of the plurality of on-demand code pieces; and
wherein the response to the HTTP request is further generated at least in part on the executed second one of the plurality of on-demand code pieces.

8. The method of claim 1, wherein each of the plurality of compute servers are anycasted to a same IP address, and wherein the first one of the plurality of compute servers receives the HTTP request because it is closest one of the plurality of compute servers to the client device as determined by an anycast implementation.

9. A non-transitory machine-readable storage medium that provides instructions that, when executed by a processor, cause said processor to perform operations comprising:
receiving, at a first one of a plurality of compute servers of a distributed cloud computing network, an indication of a hostname in a Transport Layer Security (TLS) handshake message from a client device;
determining that a first one of a plurality of on-demand code pieces is configured to execute on the first compute server responsive to receiving an HTTP request for the hostname, wherein the first on-demand code piece is not loaded for execution on the first compute server at a time of receiving the indication of the hostname received in the TLS handshake message;
responsive to the determining and prior to receiving the HTTP request for the hostname,
determining that the first on-demand code piece is not already loaded for execution on the first compute server, and
preloading the first on-demand code piece for execution on the first compute server;
receiving, at the first compute server, an HTTP request from the client device for the hostname that triggers execution of the preloaded first on-demand code piece;
executing the preloaded first on-demand code piece;
generating a response to the HTTP request based at least in part on the executed preloaded first on-demand code piece; and
transmitting the generated response to the client device.

10. The non-transitory machine-readable storage medium of claim 9, wherein the indication of the hostname is received through a Server Name Indication (SNI) extension or an Encrypted Server Name Indication (ESNI) extension of a TLS client hello message.

11. The non-transitory machine-readable storage medium of claim 9, wherein the operations further comprise:
wherein the executing the preloaded first on-demand code piece is done by a single process at the first one of the plurality of compute servers; and
wherein preloading the first on-demand code piece for execution on the first compute server includes creating a first one of a plurality of isolated execution environments and loading the first on-demand code piece in memory of the first compute server, and wherein each of the other plurality of on-demand code pieces are run in the other plurality of isolated execution environments respectively and executed by the single process.

12. The non-transitory machine-readable storage medium of claim 9, wherein executing the first on-demand code piece causes a subrequest to be generated and transmitted to an origin server of the hostname.

13. The non-transitory machine-readable storage medium of claim 9, wherein generating the response is performed without transmitting a request to an origin server of the hostname.

14. The non-transitory machine-readable storage medium of claim 9, wherein the first on-demand code piece is provided by an owner or operator of the hostname.

15. The non-transitory machine-readable storage medium of claim 9, wherein the operations further comprise:
wherein executing the first on-demand code piece causes a subrequest to be generated that triggers execution of a second one of the plurality of on-demand code pieces;
executing, at the first compute server, the second one of the plurality of on-demand code pieces; and
wherein the response to the HTTP request is further generated at least in part on the executed second one of the plurality of on-demand code pieces.

16. The non-transitory machine-readable storage medium of claim 9, wherein each of the plurality of compute servers are anycasted to a same IP address, and wherein the first one of the plurality of compute servers receives the HTTP request because it is closest one of the plurality of compute servers to the client device as determined by an anycast implementation.

17. A first compute server, comprising:
a processor; and
a non-transitory machine-readable storage medium that provides instructions that, when executed by the processor, cause the first compute server to perform operations comprising:
receiving, at the first compute server, an indication of a hostname in a Transport Layer Security (TLS) handshake message from a client device, wherein the first compute server is one of a plurality of compute servers of a distributed cloud computing network;
determining that a first one of a plurality of on-demand code pieces is configured to execute on the first compute server responsive to receiving an HTTP request for the hostname, wherein the first on-demand code piece is not loaded for execution on the first compute server at a time of receiving the indication of the hostname received in the TLS handshake message;
responsive to the determining and prior to receiving the HTTP request for the hostname, determining that the first on-demand code piece is not already loaded for execution on the first compute server, and preloading the first on-demand code piece for execution on the first compute server;

receiving, at the first compute server, an HTTP request from the client device for the hostname that triggers execution of the preloaded first on-demand code piece;

executing the preloaded first on-demand code piece;

generating a response to the HTTP request based at least in part on the executed preloaded first on-demand code piece; and transmitting the generated response to the client device.

18. The first compute server of claim 17, wherein the indication of the hostname is received through a Server Name Indication (SNI) extension or an Encrypted Server Name Indication (ESNI) extension of a TLS client hello message.

19. The first compute server of claim 17, wherein the operations further comprise:

wherein the executing the preloaded first on-demand code piece is done by a single process at the first one of the plurality of compute servers; and wherein preloading the first on-demand code piece for execution on the first compute server includes creating a first one of a plurality of isolated execution environments and loading the first on-demand code piece in memory of the first compute server, and wherein each of the other plurality of on-demand code pieces are run in the other plurality of isolated execution environments respectively and executed by the single process.

20. The first compute server of claim 17, wherein executing the first on-demand code piece causes a subrequest to be generated and transmitted to an origin server of the hostname.

21. The first compute server of claim 17, wherein generating the response is performed without transmitting a request to an origin server of the hostname.

22. The first compute server of claim 17, wherein the first on-demand code piece is provided by an owner or operator of the hostname.

23. The first compute server of claim 17, wherein the operations further comprise:

wherein executing the first on-demand code piece causes a subrequest to be generated that triggers execution of a second one of the plurality of on-demand code pieces;

executing, at the first compute server, the second one of the plurality of on-demand code pieces; and wherein the response to the HTTP request is further generated at least in part on the executed second one of the plurality of on-demand code pieces.

24. The first compute server of claim 17, wherein each of the plurality of compute servers are anycasted to a same IP address, and wherein the first one of the plurality of compute servers receives the HTTP request because it is closest one of the plurality of compute servers to the client device as determined by an anycast implementation.

* * * * *